(12) United States Patent
Kwak

(10) Patent No.: US 11,485,059 B2
(45) Date of Patent: Nov. 1, 2022

(54) DOUBLE INJECTION MOLDING SYSTEM THAT CAN AUTOMATICALLY PRODUCE VEHICLE INJECTION-MOLDED PARTS FOUR AT A TIME CONTINUOUSLY

(71) Applicant: Jeong-heon Kwak, Cheonan-si (KR)

(72) Inventor: Jeong-heon Kwak, Cheonan-si (KR)

( * ) Notice: Subject to any disclaimer, the term of this patent is extended or adjusted under 35 U.S.C. 154(b) by 190 days.

(21) Appl. No.: 16/924,807

(22) Filed: Jul. 9, 2020

(65) Prior Publication Data
US 2021/0008770 A1 Jan. 14, 2021

(30) Foreign Application Priority Data
Jul. 10, 2019 (KR) .................. 10-2019-0083136

(51) Int. Cl.
*B29C 45/16* (2006.01)
*B29C 45/12* (2006.01)
*B29L 31/30* (2006.01)

(52) U.S. Cl.
CPC ............ *B29C 45/162* (2013.01); *B29C 45/12* (2013.01); *B29C 45/1615* (2013.01); *B29C 2045/1621* (2013.01); *B29L 2031/30* (2013.01)

(58) Field of Classification Search
CPC ... B29C 45/162; B29C 45/12; B29C 45/1615; B29C 2045/1621; B29C 2045/14155; B29C 2045/2683; B29C 45/14065; B29C 45/14336; B29C 45/1676; B29C 45/0416; B29L 2031/30; B60H 1/00678
See application file for complete search history.

(56) References Cited

U.S. PATENT DOCUMENTS

| 3,732,051 A * | 5/1973 | Sakabe ................. B29C 44/388 425/436 R |
| 2005/0002311 A1* | 1/2005 | Ichihara ............... G11B 7/0938 |
| 2007/0184273 A1* | 8/2007 | MacDonald ........ B29C 45/1418 425/576 |

(Continued)

FOREIGN PATENT DOCUMENTS

| JP | 04-077221 A | 3/1992 |
| KR | 10-2009-0028338 A | 3/2009 |

(Continued)

OTHER PUBLICATIONS

Korean Office Action for KR 10-2019-0083136 dated Nov. 14, 2019.

*Primary Examiner* — Jacob T Minskey
*Assistant Examiner* — Caroline Beha
(74) *Attorney, Agent, or Firm* — Sughrue Mion, PLLC

(57) ABSTRACT

Provided is a double injection molding system capable of continuously and automatically manufacturing four molded products for a vehicle at a time, the double injection molding system including: a first molding device which molds the openable plates of the molded products for a vehicle through injection of plastic; a second molding device which receives the openable plates and molds the sealing portions through injection of rubber around the openable plates to finish the molded products; and a transport device which takes out the openable plates formed by the molding device and transports the openable plates, to the second molding device, so that the double injection molding process of the openable plates and the sealing portions is automated to secure product reliability and to improve productivity.

5 Claims, 18 Drawing Sheets

(56) References Cited

U.S. PATENT DOCUMENTS

| | | | |
|---|---|---|---|
| 2007/0274557 A1* | 11/2007 | Chiba | H04R 9/02 |
| | | | 381/396 |
| 2009/0252826 A1* | 10/2009 | Choi | B29C 33/303 |
| | | | 425/585 |
| 2018/0257278 A1* | 9/2018 | Kwak | B29C 45/162 |
| 2019/0111592 A1* | 4/2019 | Kim | B29C 45/1418 |
| 2020/0290256 A1* | 9/2020 | Seebach | B29C 45/42 |

FOREIGN PATENT DOCUMENTS

| | | |
|---|---|---|
| KR | 10-2010-0012440 A | 2/2010 |
| KR | 10-2017-0112079 A | 10/2017 |
| KR | 10-1801235 B1 | 11/2017 |

\* cited by examiner

DOUBLE INJECTION MOLDING SYSTEM THAT CAN AUTOMATICALLY PRODUCE VEHICLE INJECTION-MOLDED PARTS FOUR AT A TIME CONTINUOUSLY

BACKGROUND OF THE INVENTION

1. Field of the Invention

The present invention relates to a double injection molding system, and particularly, to a double injection molding system capable of continuously and automatically manufacturing four molded products for a vehicle at a time to automate a double injection molding process of the molded products such as a door for a vehicle air conditioner.

2. Description of the Related Art

In general, an air conditioner (HVAC: Heating, Ventilating & Air Conditioning) system that is provided for heating and cooling, ventilation, and dehumidification of a vehicle interior is configured to be capable of controlling heating and cooling temperature, an amount of airflow, and a direction of airflow according to the needs of the passenger.

In particular, the control of the amount of airflow and the direction of airflow is performed according to the operation of air outlets provided in predetermined portions of the vehicle and doors (molded products) for the air conditioner that opens and closes the air outlets.

In addition, the air outlets are classified into a vent discharge port that blows air in the upper portion of the inside of the vehicle depending on the position, a foot discharge port that blows air in the lower portion of the inside of the vehicle, and a defrost discharge port formed at a dehumidifying position of the windshield.

Such a molded product for a vehicle is configured with an openable plate which is injection-molded so as to open and close an air outlet and a sealing portion which injection-molded integrally around the openable plate.

According to this configuration, the molded product can secure airtightness that can completely block air leakage by the openable plate and the sealing portion when the outlet of the air conditioner for the vehicle is closed.

On the other hand, the molded product has a double injection structure where the openable plate is primary injection-molded by a synthetic resin material and, after that, the sealing portion is secondary injection-molded a sealing material made of rubber around the primary-injection-molded.

In the above-described double injection molding process of the molded product for a vehicle in the related art, after the openable plate is injection-molded through manual operations of a worker in a primary molding device, the worker transports the openable plate to a secondary molding device through manual operations, and then, the sealing portion is injection-molded integrally around the openable plate through manual operations. Therefore, the overall molding system of the molded product proceeds irregularly according to the skill of the worker, and thus, a high product defect rate may increase. In addition, there is a structural problem that the productivity is reduced due to the manufacturing method using manual operations.

Korean Registered Patent Publication No. 10-1801235 is a patent literature.

SUMMARY OF THE INVENTION

The present invention has been devised to solve the problems described above, and the present invention is to provide a double injection molding system, and particularly, to a double injection molding system capable of continuously and automatically manufacturing four molded products for a vehicle at a time to automate a double injection molding process where, at the time of injection-molding the molded products such as a door for a vehicle air conditioner, primary injection molding of openable plates and secondary injection molding of sealing portions are performed.

According to an aspect of the present invention, there is provided a double injection molding system capable of continuously and automatically manufacturing four molded products for a vehicle at a time, the double injection molding system including: a first molding device which molds the openable plates of the molded products for a vehicle through injection of plastic; a second molding device which receives the openable plates and molds the sealing portions through injection of rubber around the openable plates to finish the molded products; and a transport device which takes out the openable plates formed by the molding device and transports the openable plates, to the second molding device, wherein the first molding device includes a first case in which a first entrance a is formed on an upper side, a first fixed mold which is mounted inside the first case, and a first movable mold in which four cavities in which the openable plates are to be molded are formed at the time of mold-combining with the first fixed mold, wherein the second molding device includes a second case in which a second entrance a is formed on an upper side, a second fixed mold which is mounted inside the second case, and a second movable mold in which four cavities in which the sealing portions are to be molded are formed at the time of mold-combining with the second fixed mold, wherein the transport device includes a moving head which moves in X-axis and Y-axis directions on the upper side of the first molding device and the upper side of the second molding device, a stretchable rod which is provided to the moving head to be stretchable in the Z-axis direction so that the length thereof is adjusted, a first jig which is provided to the stretchable rod, enters and exits the first and second cases and through the first and second entrances a and a, takes out the four openable plates injection-molded by the first molding device, and after that, being mounted on the second movable mold of the second molding device, a second jig which is provided on a lower side of the first jig rotatably at an angle of 90 degrees, enters and exits the first and second cases and together with the first jig, moves in a state where the first jig and the second jig are on a straight line inside the first and second cases and, moves in a state where the first jig and the second jig are bent at an angle of 90 degrees outside the first and second cases and, and takes out the finished molded products from the second molding device.

Herein, the first jig includes an adsorption member which adsorbs the openable plates at the time of taking out the openable plates from the first movable mold and a pressing member which presses the openable plates at the time of mounting the openable plates on the second movable mold, and the second jig includes an adsorption member that adsorbs a molded products at the time of taking out the finished molded products from the second molding device.

And, an end surface of the pressing member of the first jig is subjected to an embossing process.

In addition, an end of the pressing member of the first jig is coated with Teflon.

In addition, each of the first and second fixed molds and the first and second movable molds is configured with a mold holder and the mold frame mounted on the mold holder, a plurality of guide grooves are formed on a front surface of the mold holder, and guide protrusions inserted into the guide grooves are provided on a back surface of the mold frame.

In addition, the openable plate has a plurality of grooves formed on both sides, and the embossed portions of the corresponding mold frame are formed to be longer so that grooves on one of the sides are formed to be deeper.

According to the double injection molding system capable of continuously and automatically manufacturing four molded products for a vehicle at a time of the present invention configured as described above, by automating the double injection molding process where, at the time of injection-molding the molded products such as a door for a vehicle air conditioner, primary injection molding of openable plates and secondary injection molding of sealing portions are performed there is an advantage that the defect rate can be significantly reduced to secure product reliability and the manufacturing time is shortened to improve productivity.

In addition, when the second jig is rotated at an angle of 90 degrees with respect to the first jig, the first jig is bent at an angle of 90 degrees in the outsides of the first and second molding devices, so that there is an advantage that the system according to the present invention can be easily operated even where the factory height is not high.

DETAILED DESCRIPTION OF THE PREFERRED EMBODIMENTS

Hereinafter, embodiments of a double injection molding system capable of continuously and automatically manufacturing four molded products for a vehicle at a time according to the present invention will be described in detail with reference to the accompanying drawings.

Figure 1:
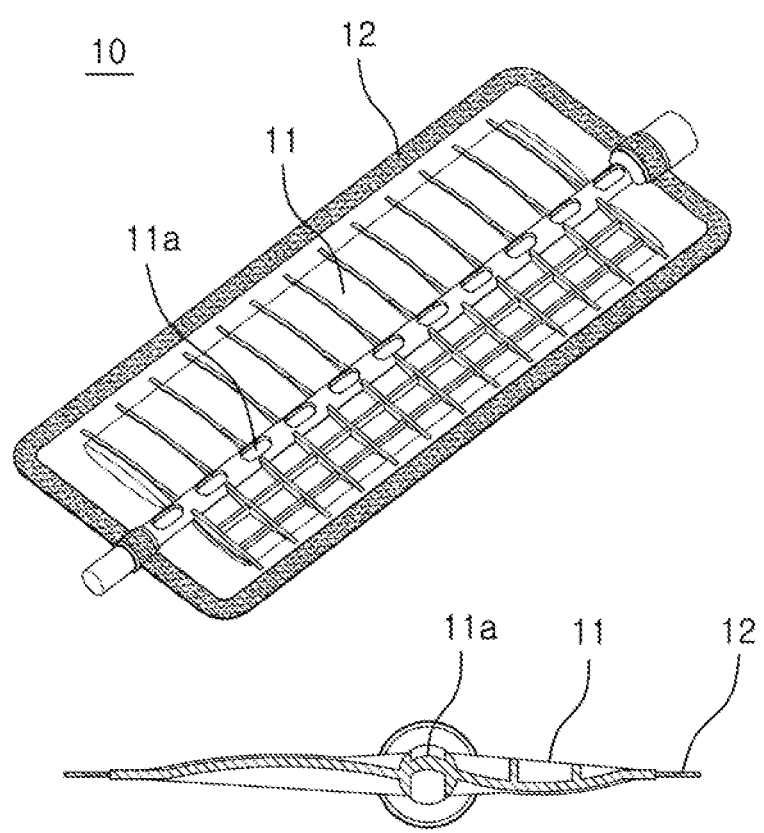
FIG. 1 is a diagram illustrating an embodiment of a molded product manufactured by a double injection molding system capable of continuously and automatically manufacturing four molded products for a vehicle at a time according to the present invention.

FIG. 1 is a diagram illustrating an embodiment of a molded product manufactured by a double injection molding system capable of continuously and automatically manufacturing four molded products for a vehicle at a time according to the present invention.

Figure 2:
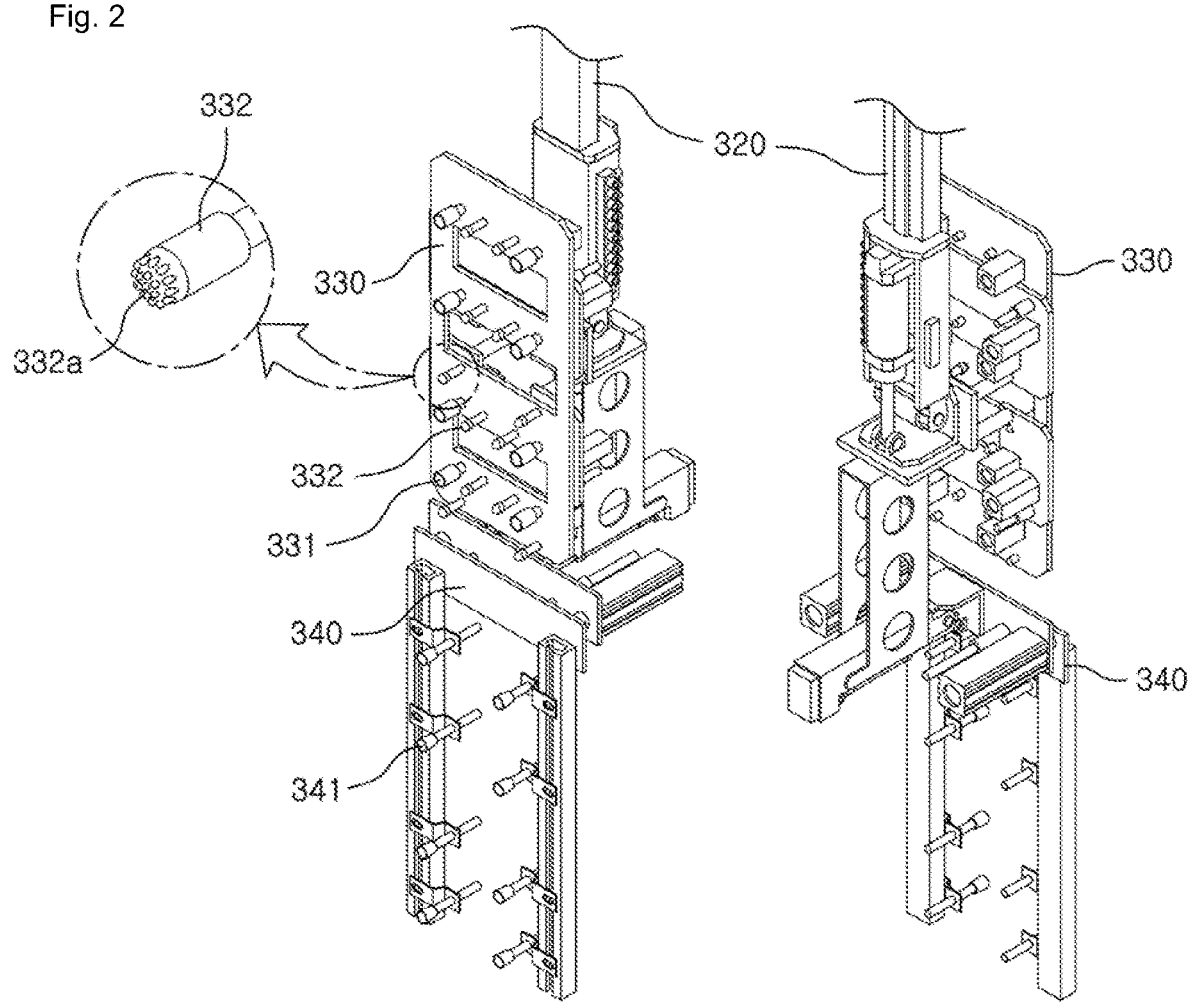
FIGS. 2 to 4 are diagrams illustrating shapes of a first jig and a second jig of the double injection molding system capable of continuously and automatically manufacturing four molded products for a vehicle at a time according to the present invention.
Figure 3:
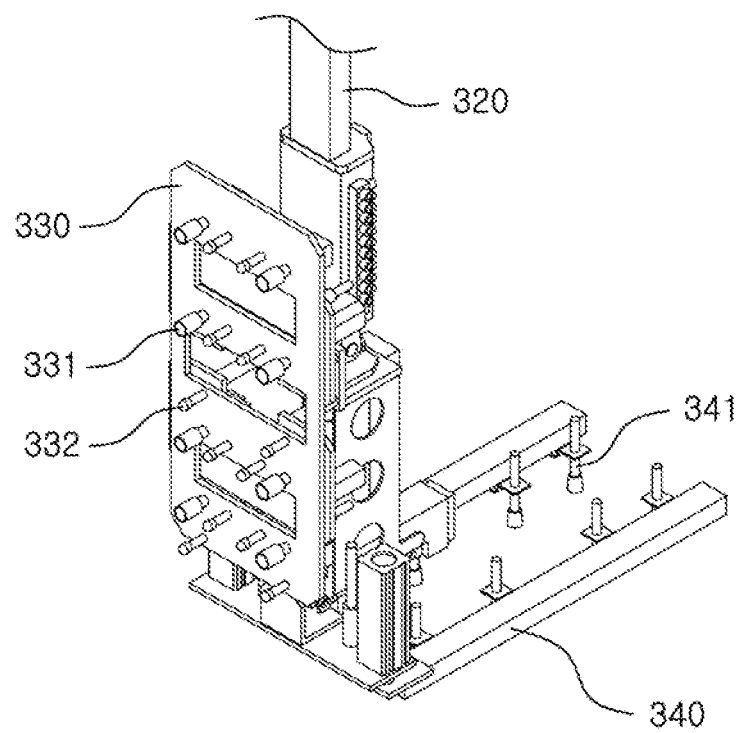
Figure 3:
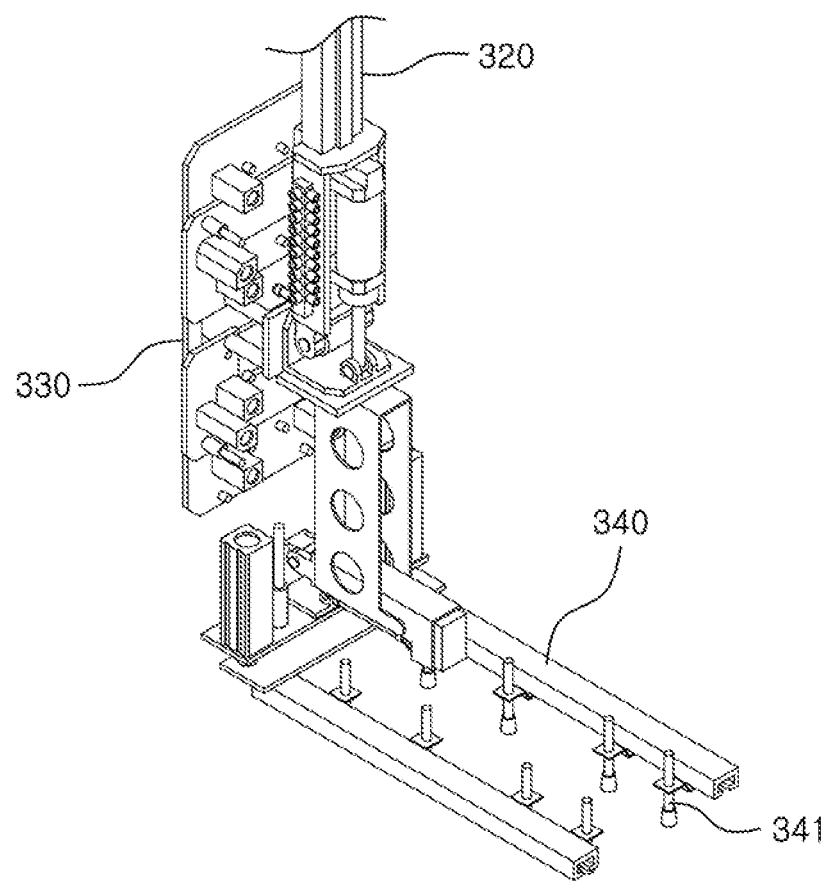
Figure 4:
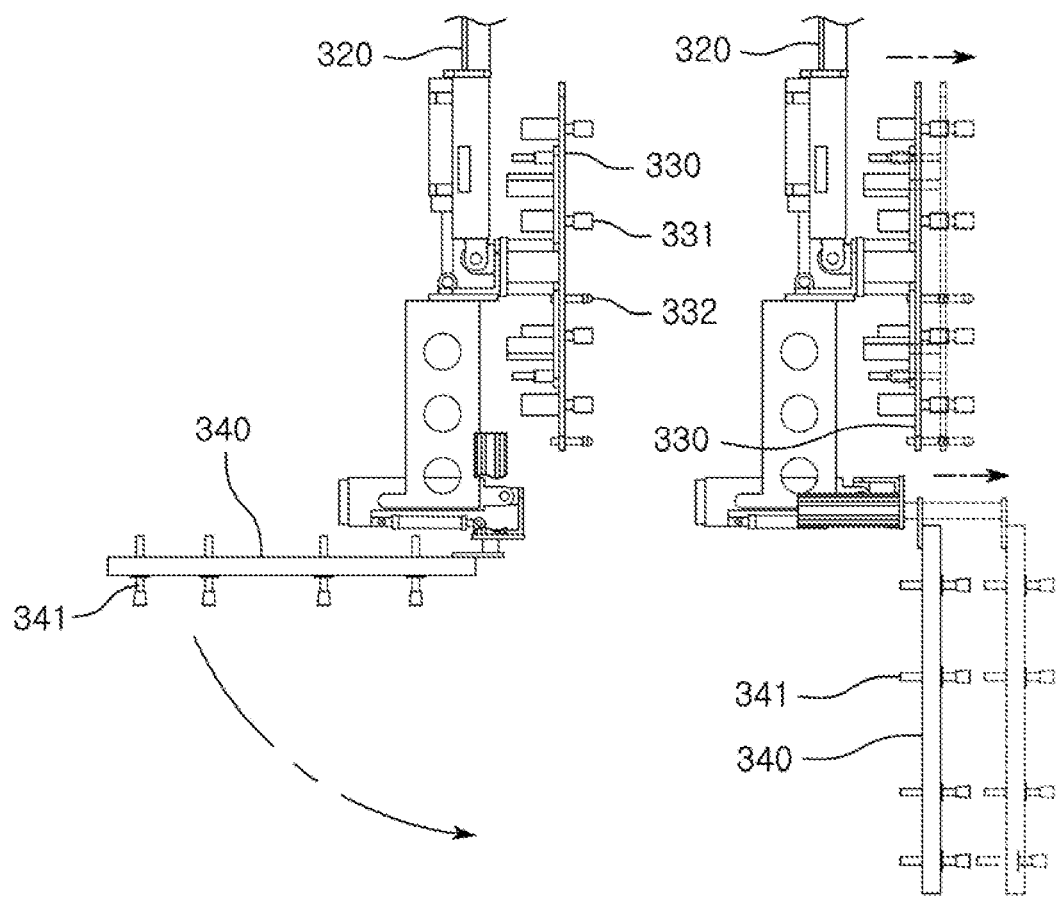
Figure 5:
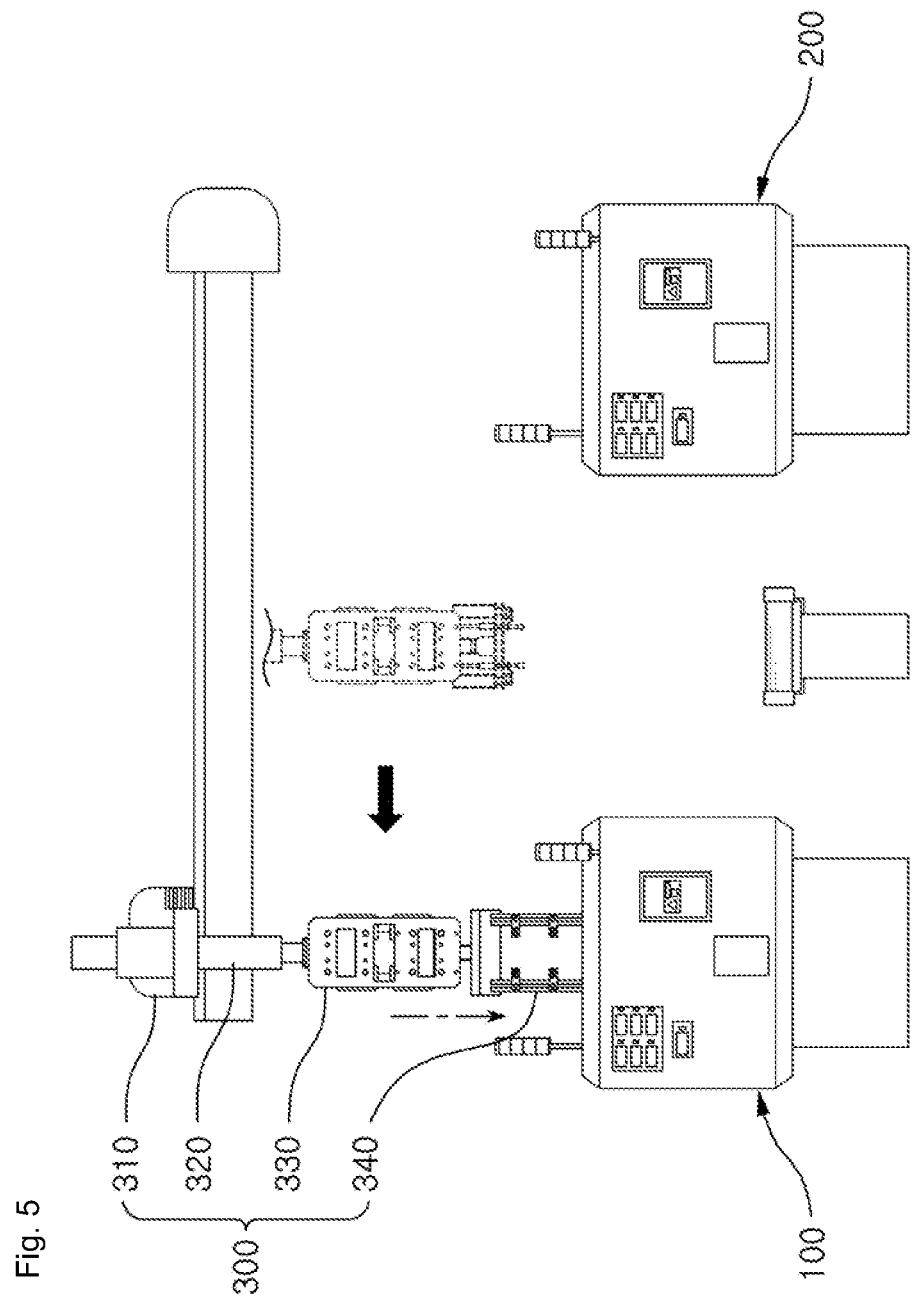
FIGS. 5 to 16 are diagrams illustrating operation processes of the double injection molding system capable of continuously and automatically manufacturing four molded products for a vehicle at a time according to the present invention.
Figure 6:
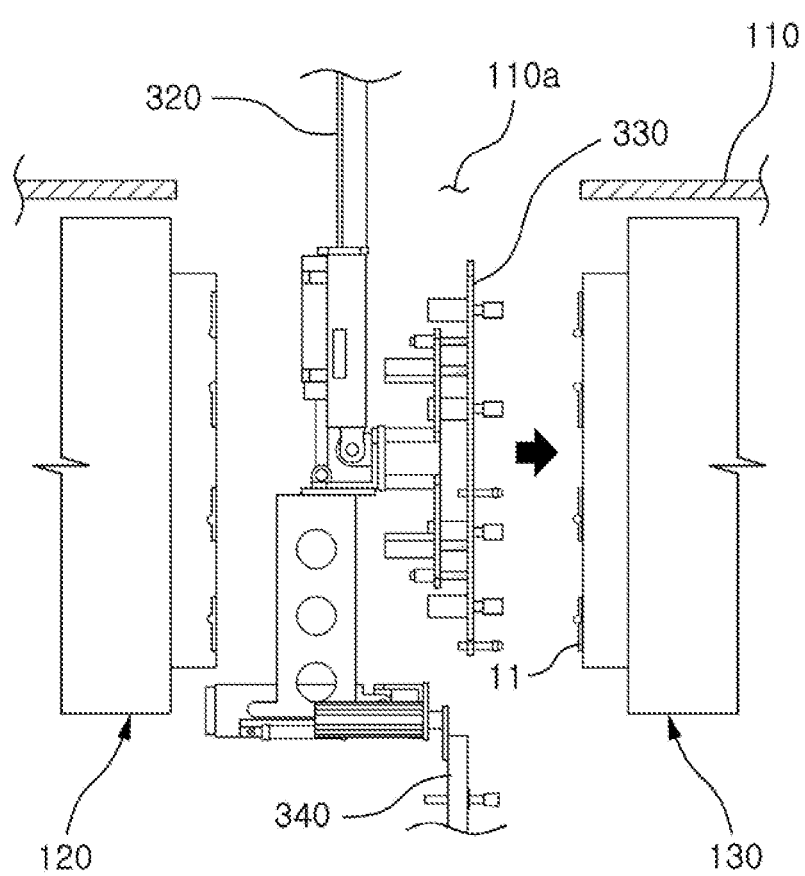
Figure 7:
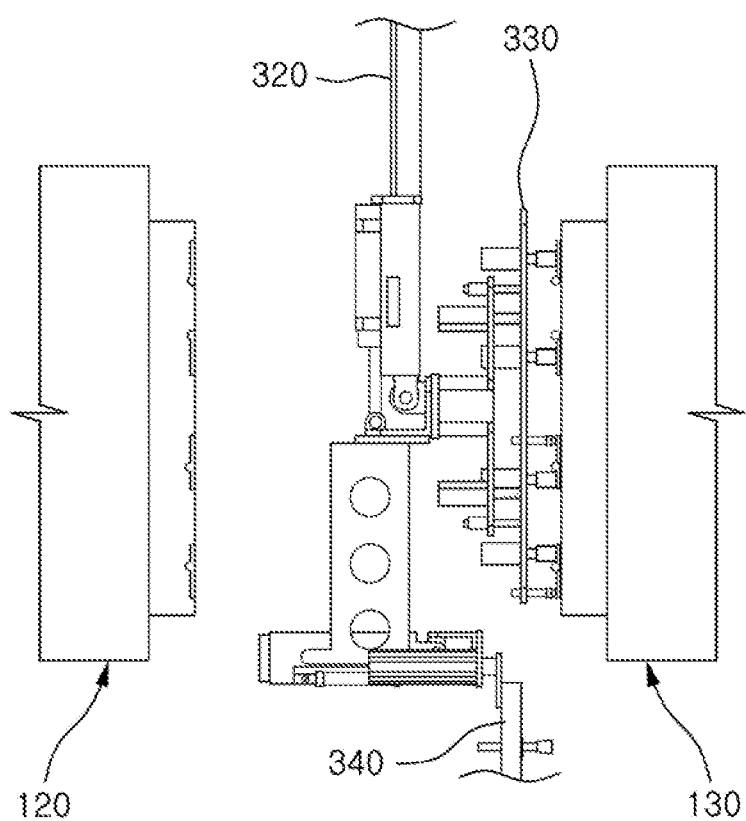
Figure 8:
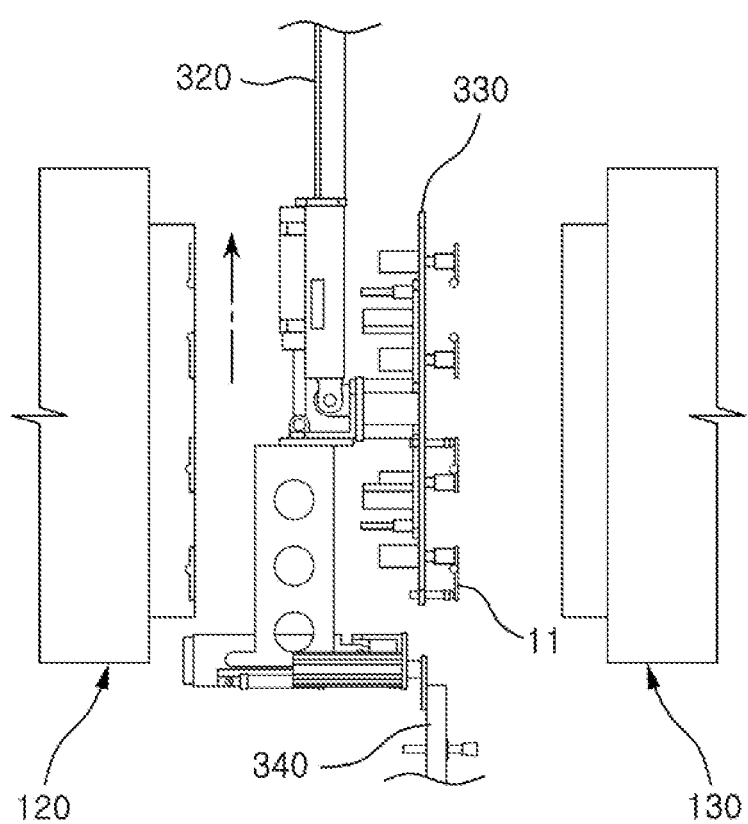
Figure 9:
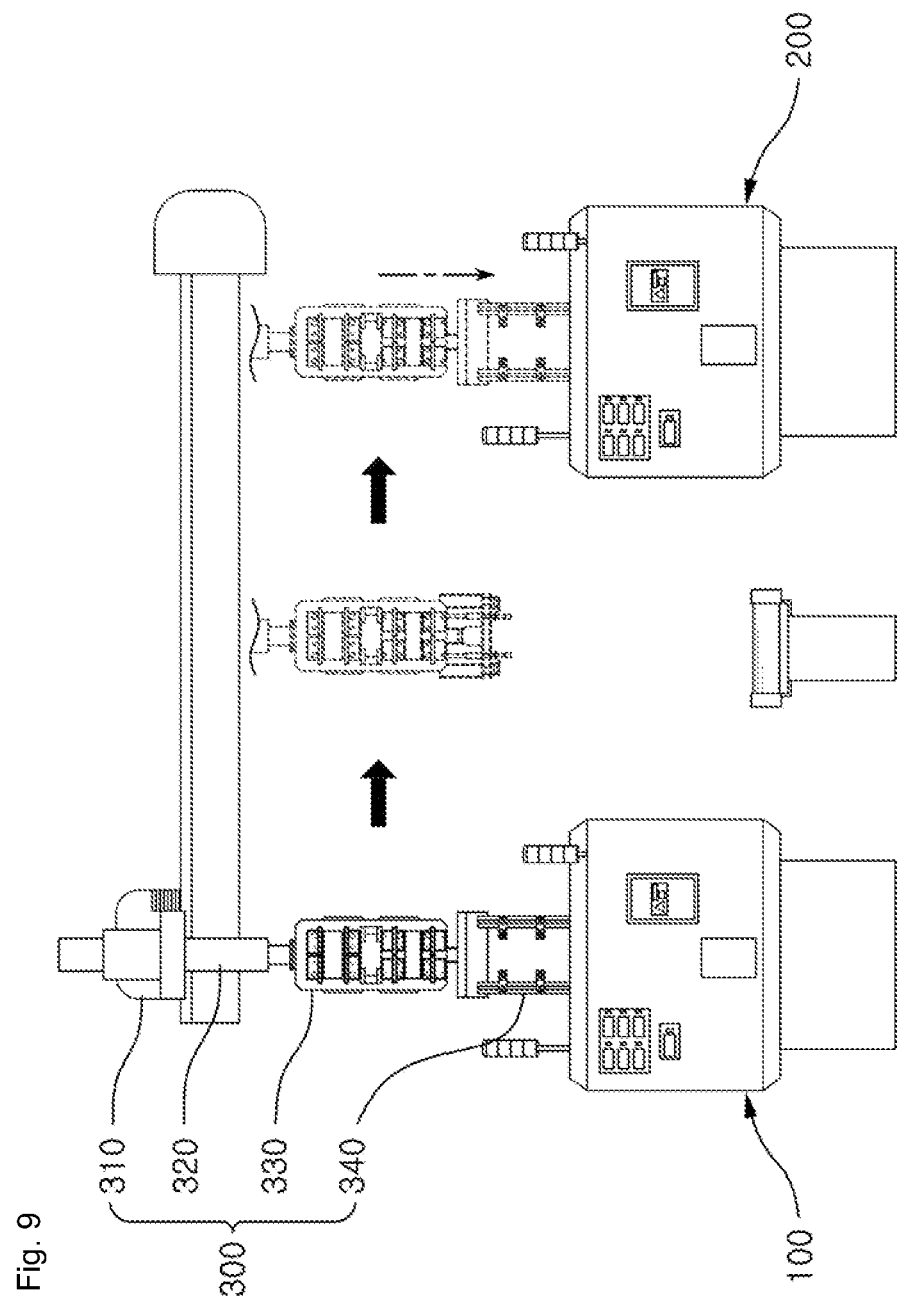
Figure 10:
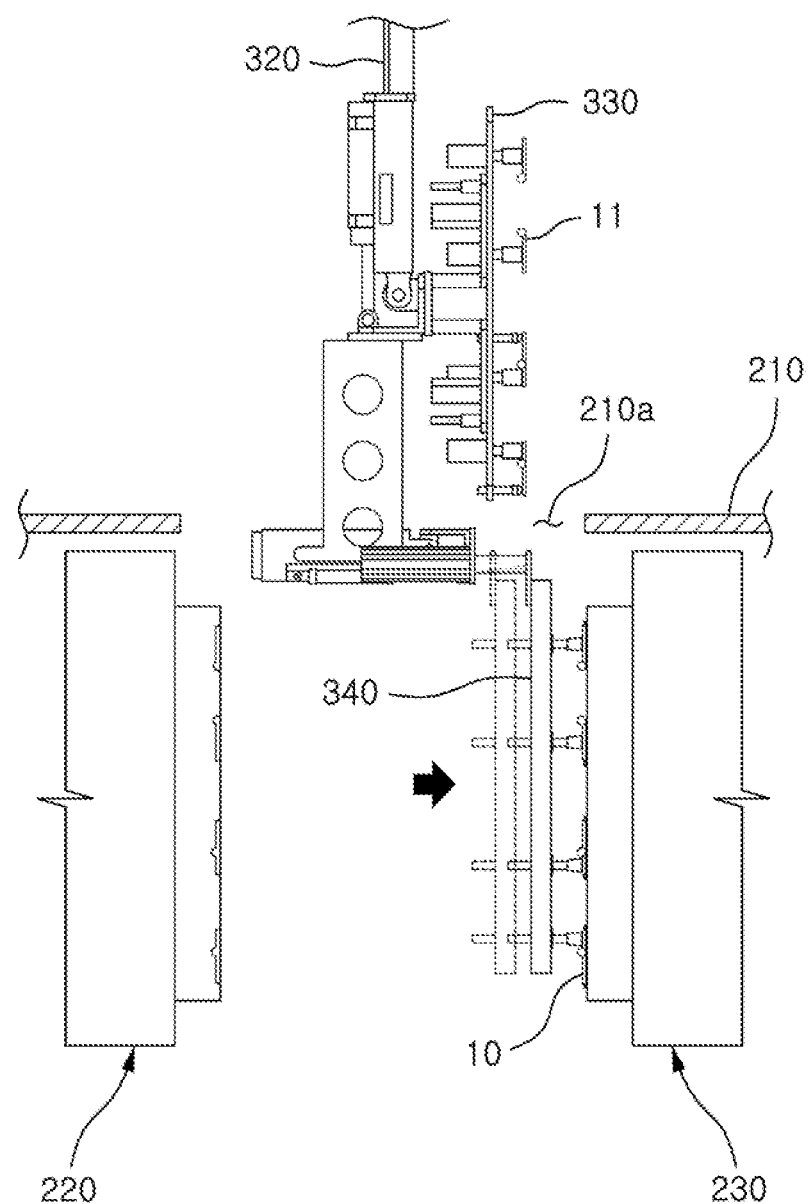
Figure 11:
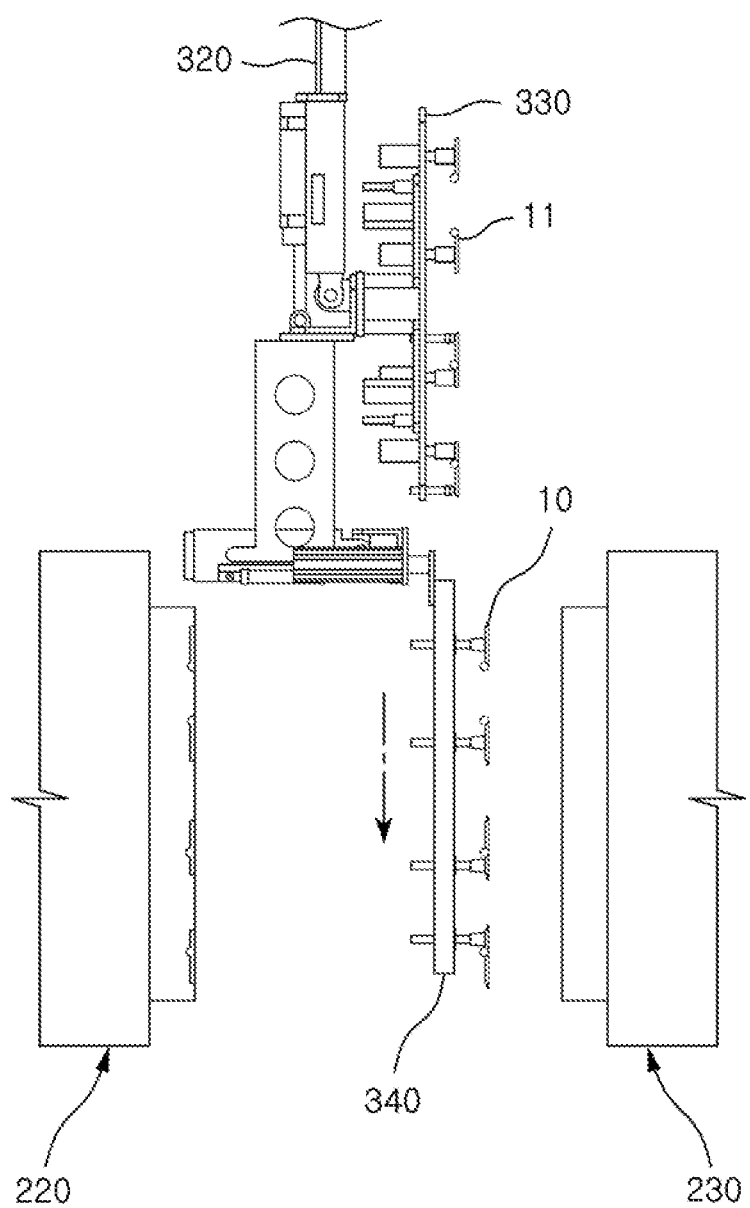
Figure 12:
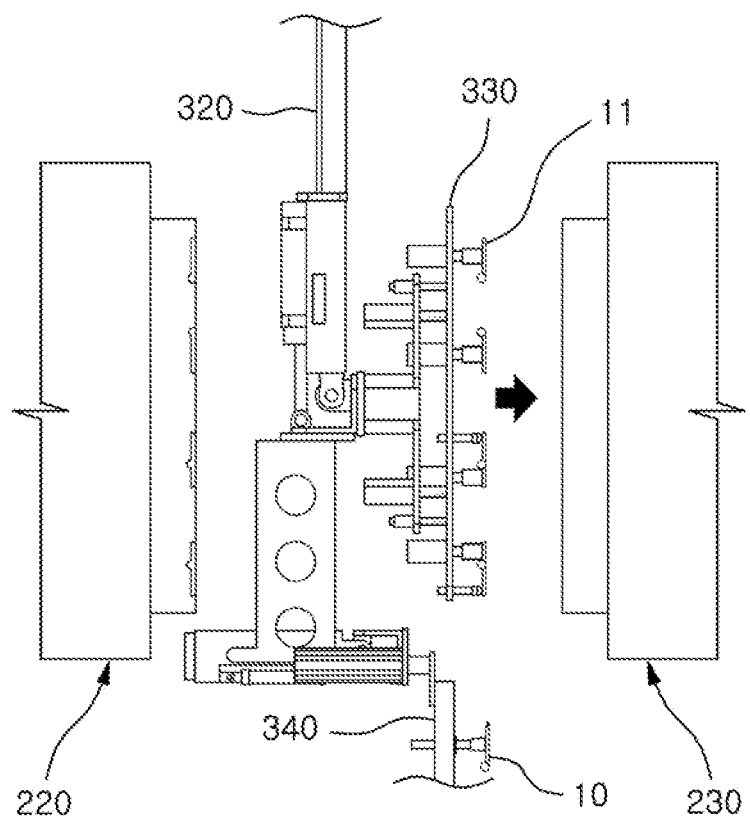
Figure 13:
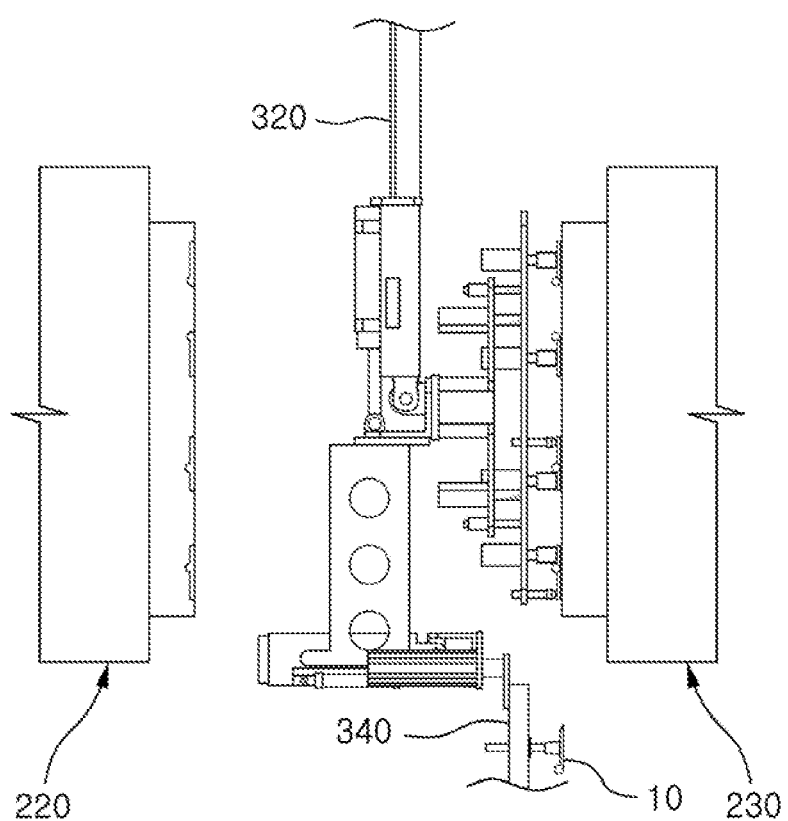
Figure 14:
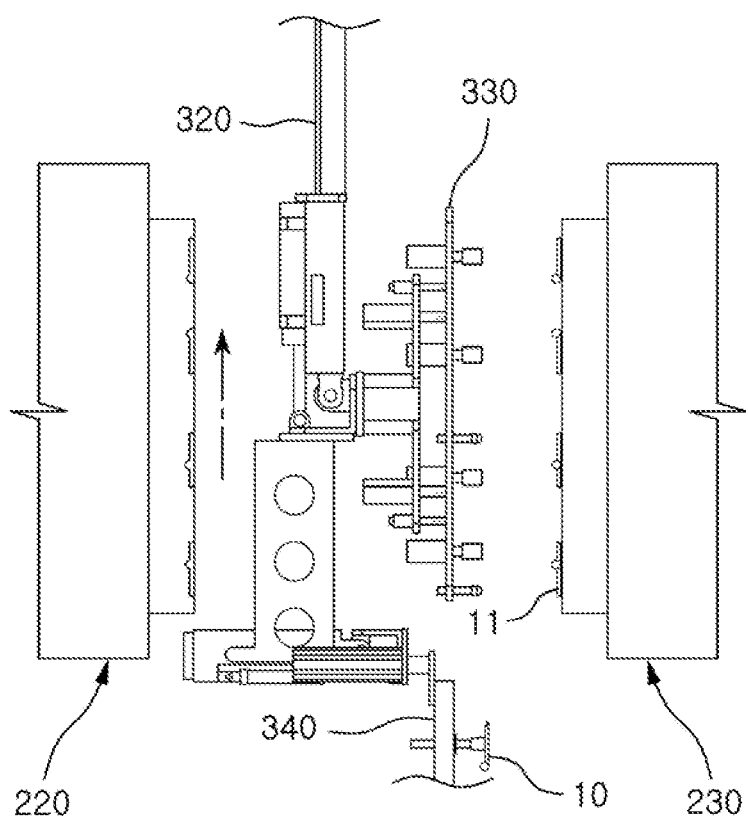
Figure 15:
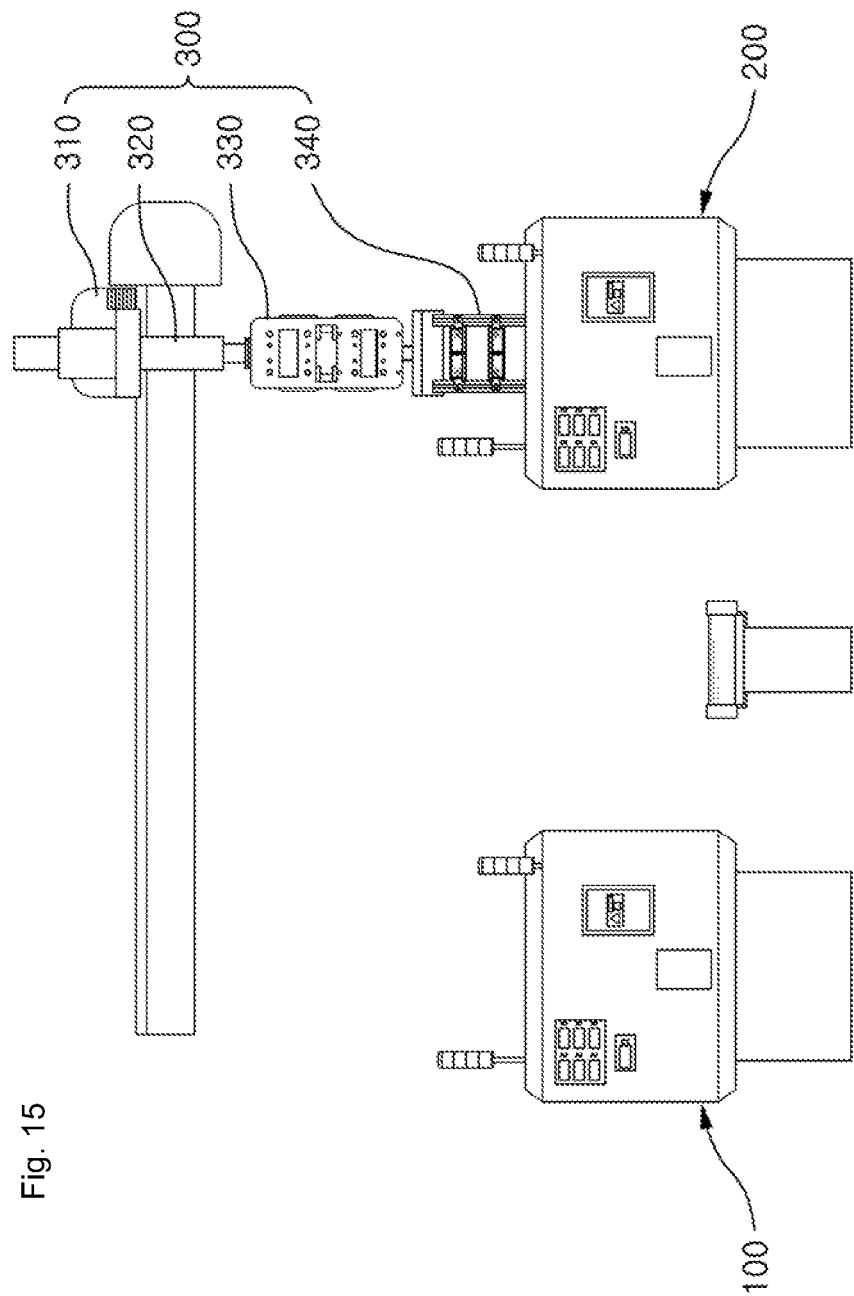
Figure 16:
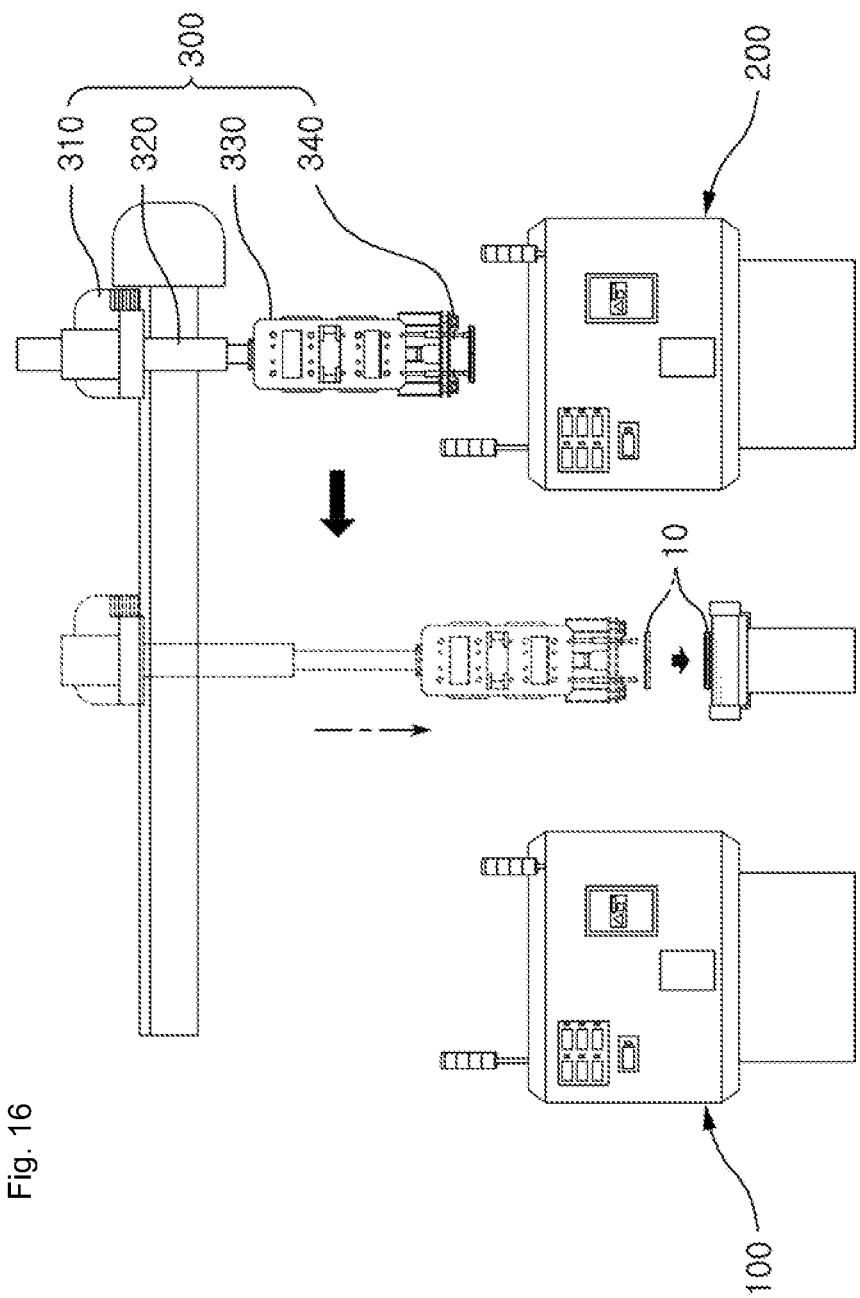

In addition, FIGS. 2 to 4 are diagrams illustrating shapes of a first jig and a second jig of the double injection molding system capable of continuously and automatically manufacturing four molded products for a vehicle at a time according to the present invention.

In addition, FIGS. 5 to 16 are diagrams illustrating operation processes of the double injection molding system capable of continuously and automatically manufacturing four molded products for a vehicle at a time according to the present invention.

Figure 17:
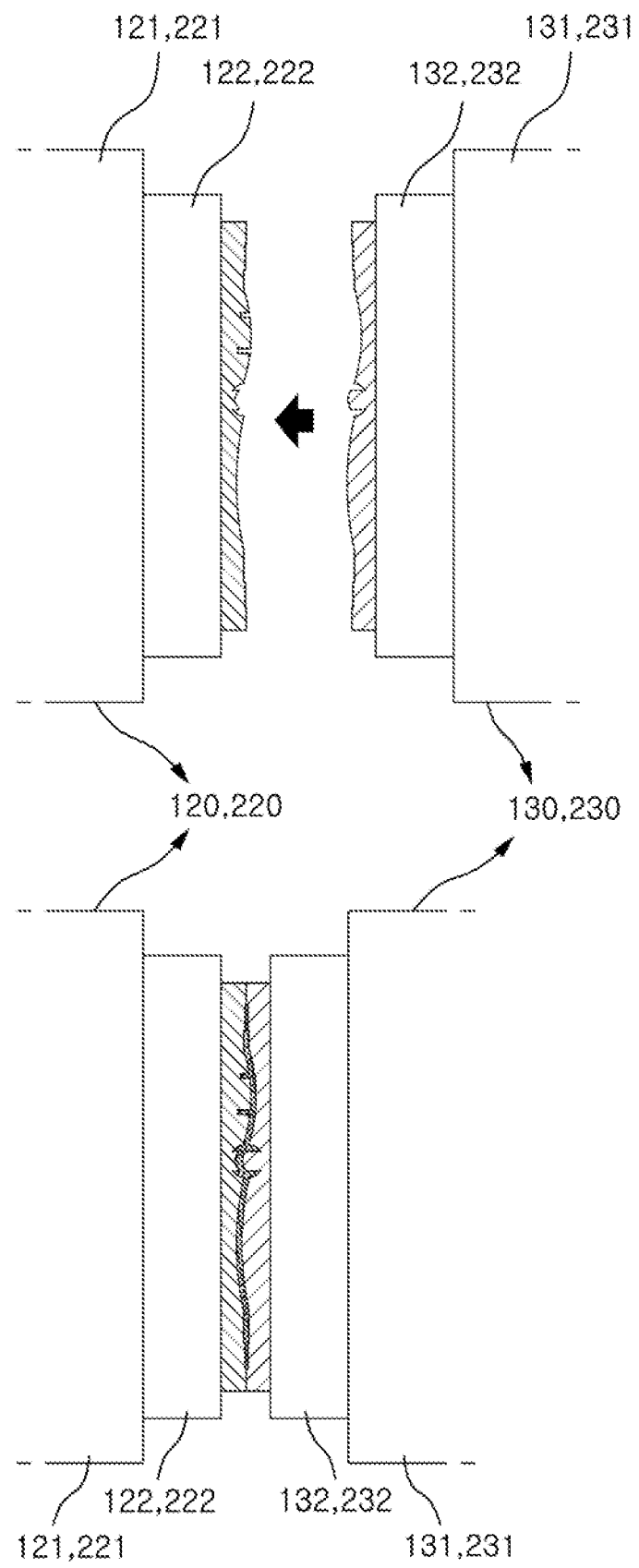
FIG. 17 is a diagram schematically illustrating shapes of a fixed mold and a movable mold of the double injection molding system capable of continuously and automatically manufacturing four molded products for a vehicle at a time according to the present invention.
Figure 18:
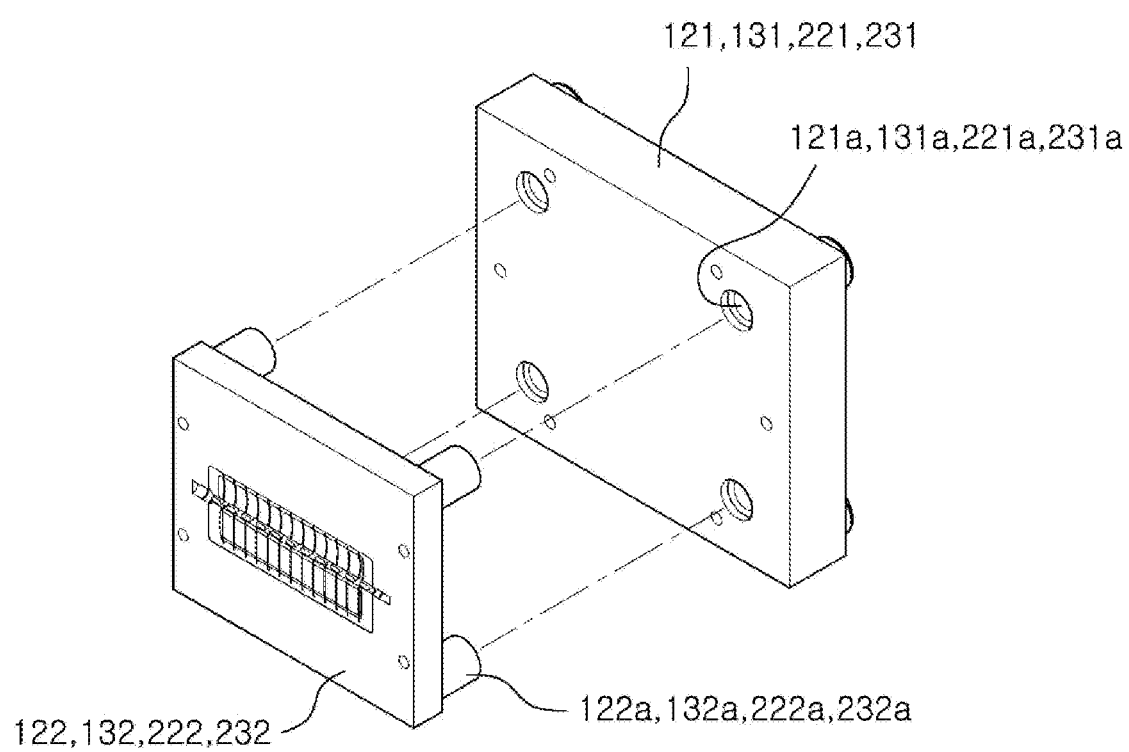
FIG. 18 is a diagram schematically illustrating shapes of mold frames provided to mold holder in the double injection molding system capable of continuously and automatically manufacturing four molded products for a vehicle at a time according to the present invention.

In addition, FIG. 17 is a diagram schematically illustrating shapes of a fixed mold and a movable mold of the double injection molding system capable of continuously and automatically manufacturing four molded products for a vehicle at a time according to the present invention. FIG. 18 is a diagram schematically illustrating shapes of mold frames provided to mold holders in the double injection molding system capable of continuously and automatically manufacturing four molded products for a vehicle at a time according to the present invention.

The double injection molding system capable of continuously and automatically manufacturing four molded products for a vehicle at a time according to the present invention, by continuously and automatically manufacturing the four molded products 10 for a vehicle at a time which are configured with the openable plates 11 molded through injection of plastic and the sealing portions 12 molded through injection of rubber around the openable plates 11, is to improve the productivity of the molded products 10 and to allow the quality of the molded products 10 to be uniform.

The double injection molding system according to the present invention is configured to include a first molding device 100 which molds the openable plates 11 of the molded products 10 for a vehicle through injection of plastic, a second molding device 200 which receives the openable plates 11 made by the first molding device 100 and molds the sealing portions 12 through injection of rubber around the openable plates 11 to finish the molded products 10, and a transport device 300 which takes out the openable plates 11 formed by the first molding device 100 and transports the openable plates 11, to the second molding device 200.

The first molding device 100 is configured to include a first case 110, a first fixed mold 120 mounted inside the first case 110, and a first movable mold 130 provided inside the first case 110 to face the first fixed mold 120.

The first case 110 constitutes an outer shape of the first molding device 100, and an opened first entrance 110a is formed on the upper side.

The first fixed mold 120 is configured with a mold holder 121 and a mold frame 122 mounted on the mold holder 121.

In the mold holder 121, a plurality of guide grooves 121a are formed on the edge portion of the front surface. The mold frame 122 is formed with embossed portions and intaglio portions, and guide protrusions 122a inserted into the guide grooves 121a are provided in the edge portion of the back surface. The mold frame 122 may be provided at the correct position of the mold holder 121 by the guide grooves 121a and the guide protrusions 122a.

The first movable mold 130 is configured with a mold holder 121 and a mold frame 132 mounted on the mold holder 121. The first movable mold 130 is mold-combined or mold-separated by moving back and forth toward the first fixed mold 120. In addition, in the first movable mold 130, four cavities in which the openable plate 11 is molded at the time of mold-combining with the first fixed mold 120 are formed in the upward-downward direction.

In the mold holder 131, a plurality of guide grooves 131a are formed in the edge portion of the front surface.

In the mold frame 132, the embossed portions and the intaglio portions are formed, the guide protrusions 132a inserted into the guide grooves 131a are provided in the edge portion of the back surface.

Herein, in other words, in the openable plate 11 of the molded product 10, a number of grooves 11a are formed on both sides by the embossed portions and the intaglio portions of the mold frame 122 (132), and when the openable plate 11 is cooled and solidified, the bending occurs to either side. In order to prevent the bending phenomenon of the openable plate 11, grooves on one side of the two sides of the openable plate 11 are formed to be deeper, and the lengths of the embossed portions of the mold frame are formed to be longer. That is, the bending phenomenon of the openable plate 11 is prevented by changing the design of the mold frame so that the grooves on the opposite side of the direction in which the bending occurs are formed to be deeper.

The second molding device 200 is configured to include a second case 210, a second fixed mold 220 mounted inside the second case 210, and a second movable mold 230 provided inside the second case 210 to face the second fixed mold 220.

The second case 210 constitutes an outer shape of the second molding device 200, and an opened second entrance 210a is formed on the upper side.

The second fixed mold 220 is configured with a mold holder 221 and a mold frame 222 mounted on the mold holder 221.

In the mold holder 221, a plurality of guide grooves 221a are formed in the edge portion of the front surface.

In the mold frame 222, the guide protrusion 222a that is to be inserted into the guide groove 221a is provided in the edge portion of the back surface. The mold frame 222 may be provided at the correct position of the mold holder 221 by the guide groove 221a and the guide protrusion 222a.

The second movable mold 230 is configured with a mold holder 231 and a mold frame 232 mounted on the mold holder 231. The second movable mold 230 is mold-combined or mold-separated by moving back and forth toward the second fixed mold 220. In addition, in the second movable mold 230, four cavities in which the sealing portion 12 is to be molded at the time of mold-combining with the second fixed mold 220 are formed in the upward-downward direction.

In the mold holder 231, a plurality of guide grooves (231a) are formed in the edge portion of the front surface.

In the mold frame 232, the guide protrusion 232a that is to be inserted into the guide groove (231a) is provided in the edge portion of the back surface.

The transport device 300 is configured to include a moving head 310, a stretchable rod 320 stretchably provided on the moving head 310, the first jig 330 provided in the stretchable rod 320, and the second jig 340 rotatably provided below the first jig 330.

The moving head 310 moves in the X-axis and Y-axis directions above the first molding device 100 and the second molding device 200. That is, the moving head 310 moves in the forward-backward direction and the leftward-rightward direction on the first and second cases 110 and 210.

The stretchable rod 320 is provided to the moving head 310, and the length thereof is adjusted in the Z-axis direction in the same manner as an antenna. That is, the length of the stretchable rod 320 is adjusted in the upward-downward direction. Therefore, since the moving head 310 is moved in the X-axis and Y-axis directions, and the length of the stretchable rod 320 in the Z-axis direction is adjusted, the first jig 330 and the second jig 340 provided at the lower end of the stretchable rod 320 can move in the XYZ axes.

The first jig 330 is provided at the bottom of the stretchable rod 320 to enter and exit the first case 110 and the second case 210 through the first entrance 110a and the second entrance 210a, so that the four openable plates 11 injection-molded by the first molding device 100 are simultaneously taken out, and after that, the openable plates are mounted on the second movable mold 230 of the second molding device 200 simultaneously.

In other words, when the length of the stretchable rod 320 is lengthened, the first jig 330 enters the first and second cases 110 and 210; and when the length of the stretchable rod 320 is shortened, the first jig 330 exits the first and second cases 110 and 210.

The first jig 330 includes the adsorption member 331 and a pressing member 332.

The adsorption member 331 is a component that adsorbs the openable plate 11 at the time of taking out the openable plate 11 mounted on the first movable mold 130 of the first molding device 100. The adsorption member 331 detaches the openable plate 11 from the first movable mold 130 with the adsorption force exerted from the adsorption device (not illustrated).

The pressing member 332 is a component that presses the openable plate 11 at the time of mounting the openable plate 11 on the second movable mold 230 of the second molding device 200. That is, the openable plate 11 is detached from the first movable mold 130 with the adsorption member 331, and the detached openable plate 11 is mounted on the second movable mold 230 with the pressing member 332.

Herein, it is preferable that the end surface of the pressing member 332 is subjected to an embossing process 332a. The openable plate 11 is sufficiently solidified until the openable plate 11 detached from the first movable mold 130 is mounted on the second movable mold 230. Therefore, when the openable plate 11 is pressed, the openable plate 11 is pressed against the end of the pressing member 332, so that The openable plate 11 may not be mounted at the correct position of the second movable mold 230. In order to prevent this phenomenon, the end of the openable plate 11 is subjected to an embossing process 332a to reduce the contact area with the openable plate 11 while pressing the openable plate 11.

In addition, from the viewpoint that the temperature of the openable plate 11 is high, it is also preferable that the end of the pressing member 332 is coated with Teflon having heat resistance, corrosion resistance, and low friction.

The second jig 340 is rotatably provided at an angle of 90 degrees below the first jig 330, and the second jig together with first jig 330 enters and exits the first case 110 and the second case 210 through the first entrance 110a and the second entrance 210a, the four finished molded products 10 are simultaneously taken out.

In other words, when the second jig 340 together with the first jig 330 enters and exits the first and second cases 110 and 210 the first and second cases 110 and 210, in the inside of the first and second cases 110 and 210, the first jig 330 and the second jig 340 move in a state where the first jig and the second jig are on a straight line; and in the outside of the first and second cases 110 and 210, the first jig 330 and the second jig 340 move in a state where the first jig and the second jig are bent at an angle of 90 degrees.

The second jig 340 includes the adsorption member 341.

The adsorption member 341 is a component that absorbs the molded product 10 at the time of taking out the finished molded product 10 mounted on the second movable mold 230 of the second molding device 200. The adsorption member 341 detaches the molded product 10 configured with the openable plate 11 and the sealing portion 12 with an adsorption force exerted by the adsorption device from the second movable mold 230.

The operation processes of the double injection molding system capable of continuously and automatically manufacturing four molded products for a vehicle at a time according to the present invention configured as described above are as follows.

First, the four openable plates 11 of the molded product 10 are simultaneously molded through injection of plastic by the first molding device 100. Then, the four molded products 10 for a vehicle where the sealing portions 12 are molded through injection of rubber by the second molding device 200 around the openable plate 11 are simultaneously finished.

In a state where the first jig 330 and the second jig 340 are bent at an angle of 90 degrees, the moving head 310 moves to the upper side of the first entrance 110a of the first case 110, and the first jig 330 and the second jig 340 are on a straight line, and after that, the stretchable rod 320 is stretched, so that the first jig 330 and the second jig 340 enter the inside of the first case 110.

Between the first fixed mold 120 and the first movable mold 130, the first jig 330 advances toward the first movable mold 130, so that the four openable plates 11 mounted on the first movable mold 130 are simultaneously adsorbed with the adsorption member 331 and, after that, taken out.

After the stretchable rod 320 is shrinked and the first jig 330 and the second jig 340 are bent at an angle of 90 degrees, the moving head 310 moves toward the second entrance 210a of the second case 210.

After the first jig 330 and the second jig 340 are on a straight line above the second entrance 210a, the stretchable rod 320 is stretched, so that the second jig 340 provided at the lower end of the first jig 330 enters between the second fixed mold 220 and the second movable mold 230 of the second molding device 200.

The second jig 340 advances toward the second movable mold 230, and thus, the four finished molded products 10 mounted on the second movable mold 230 are simultaneously adsorbed with the adsorption member 341 and, after that, taken out.

After that, the stretchable rod 320 is further stretched, so that the first jig 330 enters between the second fixed mold 220 and the second movable mold 230.

The first jig 330 advances toward the second movable mold 230, and thus, the four openable plates 11 are simultaneously mounted on the second movable mold 230.

The stretchable rod 320 is shrinked, and the first jig 330 and the second jig 340 exit the second molding device 200. After that, in a state where the first jig 330 and the second jig 340 are bent at an angle of 90 degrees, the moving head 310 moves to a loading location between the first molding device 100 and the second molding device 200.

While maintaining the state where the first jig 330 and the second jig 340 are bent at an angle of 90 degrees, the stretchable rod 320 is stretched on the loading location, and the exertion of an adsorption force to the second jig 340 is stopped, so that the molded products 10 attached to the adsorption member 341 of the second jig 340 is loaded at the loading location.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

What is claimed is:

1. A double injection molding system capable of continuously and automatically manufacturing four molded products for a vehicle at a time, the double injection molding system comprising:
   a first molding device 100 which molds the openable plates 11 of the molded products 10 for a vehicle through injection of plastic;
   a second molding device 200 which receives the openable plates 11 and molds the sealing portions 12 through injection of rubber around the openable plates 11 to finish the molded products 10; and a transport device 300 which takes out the openable plates 11 formed by the molding device 100 and transports the openable plates 11, to the second molding device 200,
   wherein the first molding device 100 includes a first case 110 in which a first entrance 110a is formed on an upper side, a first fixed mold 120 which is mounted inside the first case 110, and a first movable mold 130 which forms four cavities for molding the openable plates 11 when combined with the first fixed mold 120,
   wherein the second molding device 200 includes a second case 210 in which a second entrance 210a is formed on an upper side, a second fixed mold 220 which is mounted inside the second case 210, and a second movable mold 230 which forms four cavities for molding the sealing portions 12 when combined with the second fixed mold 220,
   wherein the transport device 300 includes:
   a moving head 310 which moves in X-axis and Y-axis directions on the upper side of the first molding device 100 and the upper side of the second molding device 200;
   a stretchable rod 320 which is provided to the moving head 310 to be stretchable in the Z-axis direction so that the length thereof is adjusted;
   a first jig 330 which is coupled to the stretchable rod 320, enters and exits the first and second cases 110 and 210 through the first and second entrances 110a and 210a, respectively, takes out the four openable plates 11 injection-molded by the first molding device 100, and mounts the four openable plates 11 on the second movable mold 230 of the second molding device 200;
   a second jig 340 which is coupled to a lower side of the first jig 330, and rotates to be bent at an angle of 90 degrees with respect to the first jig 330, enter and exit the first and second cases 110 and 210 together with the first jig 330, moves in a state where the first jig 330 and the second jig 340 are on a straight line inside the first and second cases 110 and 210, moves in a state where the second jig 340 is bent at the angle of 90 degrees with respect to the first jig 330 outside the first and second cases 110 and 210, and takes out the finished molded products 100 from the second molding device 200, wherein the first jig 330 includes an adsorption member 331 which adsorbs the openable plates 11 at the time of taking out the openable plates 11 from the first movable mold 130 and a pressing member 332 which presses the openable plates 11 at the time of mounting the openable plates 11 on the second movable mold 230 of which an end surface is subjected to an embossing process 332a, wherein the second jig 340 includes an adsorption member 341 which adsorbs the molded products 10 at the time of taking out the finished molded products 10 from the second molding device 200, wherein, in a state where the four molded products 10 for a vehicle in which the four openable plates 11 of the molded product 10 are molded simultaneously through injection of plastic by the first molding device 100 and sealing portions 12 are molded around the openable plates 11 through injection molding of rubber by the molding device 200 are finished simultaneously, in a state where the first jig 330 and the second jig 340 are bent at an angle of 90 degrees, the moving head 310 moves to the upper side of the first entrance 110a of the first case 110 so that the first jig 330 and the second jig 340 are on a straight line, after that, the stretchable rod 320 is stretched, and the first jig 330 and the second jig 340 enter the first case 110, wherein, between the first fixed mold 120 and the first movable mold 130, the first jig 330 advances toward the first movable mold 130, to the first movable mold 130, and the four openable plates 11 mounted on the first movable mold 130 are simultaneously adsorbed with the adsorption member 331 and, after that, taken out, wherein the stretchable rod 320 is shrunk, the first jig 330 and the second jig 340 are bent at an angle of 90 degrees, and after that, the moving head 310 moves toward the second entrance 210a of the second case 210, wherein, after the first jig 330 and the second jig 340 are on a straight line above the second entrance 210a, the stretchable rod 320 is stretched, the second jig 340 provided at the bottom of the first jig 330 enters between the second fixed mold 220 and the second movable mold 230 of the second molding device 200, wherein the second jig 340 advances toward the second movable mold 230, the four finished molded products 10 mounted on the second movable mold 230 are simultaneously adsorbed with the adsorption member 341 and, after that, taken out, wherein, after that, the stretchable rod 320 is further stretched, so that the first jig 330 enters between the second fixed mold 220 and the second movable mold 230, wherein the first jig 330 advances toward the second movable mold 230, and the four openable plates 11 are simultaneously mounted on the second movable mold 230, wherein the stretchable rod 320 is shrunk so that the first jig 330 and the second jig 340 exit the second molding device 200, and after that, in a state where the moving head 310 moves to a loading location between the first molding device 100 and the second molding device 200, and wherein, while maintaining the state where the first jig 330 and the second jig 340 are bent at an angle of 90 degrees, the stretchable rod 320 is stretched on the loading location, and the exertion of an adsorption force to the second jig 340 is stopped, so that the molded products 10 attached to the adsorption member 341 of the second jig 340 is loaded at the loading location.

2. The double injection molding system according to claim 1,
wherein an end face of the pressing member 332 of the first jig 330 is subjected to an embossing process 332a.

3. The double injection molding system according to claim 1,
wherein an end of the pressing member 332 of the first jig 330 is coated with Teflon.

4. The double injection molding system according to claim 1,
wherein each of the first and second fixed molds 120 and 220 and the first and second movable molds 130 and 230 is configured with mold holders 121 and 221 (131 and 231) and mold frames 122 and 222 (132 and 232) mounted on the mold holders 121 and 221 (131 and 231), and
wherein a plurality of guide grooves 121a and 221a (131a and 231a) are formed on front surfaces of the mold holders 121 and 221 (131 and 231), and guide protrusions 122a and 222a (132a and 232a) inserted into the guide grooves 121a and 221a (131a and 231a) are provided on back surfaces of the mold frames 122 and 222 (132 and 232).

5. The double injection molding system according to claim 4,
wherein the openable plate 11 has a plurality of grooves 11a formed on both sides, and guide protrusions of the corresponding mold frame are formed to be longer so that grooves on one of the sides are formed to be deeper.

* * * * *